US008582645B2

(12) United States Patent
Mathew et al.

(10) Patent No.: US 8,582,645 B2
(45) Date of Patent: Nov. 12, 2013

(54) REDUCING FLICKER IN THE DISPLAY OF VIDEO STREAMS

(75) Inventors: Manu Mathew, Bangalore (IN); Soyeb Nagori, Bangalore (IN); Akira Osamoto, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 249 days.

(21) Appl. No.: 12/794,942

(22) Filed: Jun. 7, 2010

(65) Prior Publication Data

US 2010/0315557 A1    Dec. 16, 2010

Related U.S. Application Data

(60) Provisional application No. 61/186,193, filed on Jun. 11, 2009.

(51) Int. Cl.
*H04N 5/00* (2011.01)

(52) U.S. Cl.
USPC ............. 375/240.03; 375/240.12; 375/240.24

(58) Field of Classification Search
USPC ........................... 375/240.03, 240.12, 240.24
See application file for complete search history.

(56) References Cited

U.S. PATENT DOCUMENTS

| | | | | |
|---|---|---|---|---|
| 4,023,199 A | * | 5/1977 | Netravali et al. | 375/240.25 |
| 5,396,567 A | * | 3/1995 | Jass | 382/251 |
| 5,799,111 A | * | 8/1998 | Guissin | 382/254 |
| 6,188,792 B1 | * | 2/2001 | Chujoh et al. | 382/236 |
| 6,512,537 B1 | * | 1/2003 | Shimizu et al. | 348/155 |
| 6,636,565 B1 | * | 10/2003 | Kim | 375/240.27 |
| 6,683,988 B1 | * | 1/2004 | Fukunaga et al. | 382/236 |
| 2004/0101055 A1 | * | 5/2004 | Hourunranta | 375/240.24 |
| 2009/0161010 A1 | * | 6/2009 | Tran et al. | 348/441 |

OTHER PUBLICATIONS

Yang, H. "Effective Flicker Removal for Periodic Intra Frame and Accurate Flicker Measurement", ICIP 2008, IEEE 2008 Oct. 12-15, 2008 San Diego, California pp. 2868-2871.*
ITU-T Recommendation H.264, "Advanced video coding for generic audiovisual services", Mar. 2005.
Effective flicker removal from periodic intra frames and accurate flicker measurement, Hua Yang, Jill M. Boyce, and Alan Stein, ICIP 2008, 15th IEEE International Conference on Image Processing.

(Continued)

*Primary Examiner* — Sath V Perungavoor
*Assistant Examiner* — Jeffery Williams
(74) *Attorney, Agent, or Firm* — Mirna Abyad; W. James Brady; Frederick J. Telecky, Jr.

(57) ABSTRACT

Image frames of a video stream are encoded with the aim of reducing flicker in the video stream when displayed. In one embodiment, the quantization parameter used to quantize an image frame is capped to be not greater than a quantization parameter used to quantize an immediately previous image frame. In another embodiment, the quantization step size used to quantize a macro-block of an image frame is computed based on the value of a quantization error of a co-located macro-block in an immediately previous image frame. In yet another embodiment, macro-block transform coefficients corresponding to high-frequency components are quantized using relatively higher quantization parameter values if the image frame is deemed to contain high activity. In yet another embodiment, flicker-prone macro-blocks of a source frame are replaced by corresponding best-match macro-blocks of a previous reconstructed frame, prior to being encoded.

9 Claims, 5 Drawing Sheets

(56) References Cited

OTHER PUBLICATIONS

Seong Sco Chun Jung-Rim Kim and Sangnoon Sull "Intra prediction mode selection for flicker reduction in H.264/AVC," Consumer Electronics, IEEE Transactions on, vol. 52, No. 4, pp. 1303-1310, Nov. 2006.

Jie Xiang Yang and Hong Ren wu, A non-Jinear post filtering method for flicker reduction in H.264/AVC coded video Sequences, Multimedia Signal processing .2008 IEEE 10thworkshop on. Vol.no.pp. 181-186,Oct. 8-10, 2008.

Seong Soo Chun, Han-Jin Ryu and sanghoon Sull, "Flicker Reduction in intra coded Frames of H.264;AVC," Image processing ,2006 IEEE International Conference on.vol.no.pp. 2025-2028,Oct. 8-11, 2006.

Hua Yang, Boyce, JM: Stein,A "Effective flicker removal from periodic intra frames and accurate flicker measurement," Image processing ,2008 15th IEEE International Conference on vol.no.pp. 2868-2871,Oct. 12-15, 2008.

"Advanced video coding for generic audiovisual services" ITU-T Rec. H.264, p. 1-341, Dated: Mar. 2005.

* cited by examiner

DISPLAY AND ENCODING
ORDER (IN TIME)

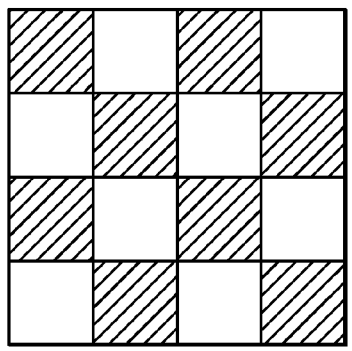

FIG. 4A

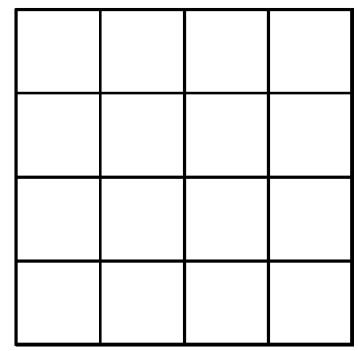

FIG. 4B

510 — COMPUTE AN ACTIVITY MEASURE FOR AN IMAGE FRAME

520 ACTIVITY MEASURE LESS THAN A THRESHOLD?

YES → 530 ENCODE ALL TRANSFORM COEFFICIENTS OF A MACRO-BLOCK USING A SAME QUANTIZATION PARAMETER

NO → 540 ENCODE TRANSFORM COEFFICIENTS WHICH REPRESENT HIGHER FREQUENCY COMPONENTS WITH A QUANTIZATION VALUE GREATER THAN A QUANTIZATION VALUE USED TO ENCODE TRANSFORM COEFFICIENTS OF THE MACRO-BLOCK WHICH REPRESENT LOWER FREQUENCY COMPONENTS

FIG. 5

REDUCING FLICKER IN THE DISPLAY OF VIDEO STREAMS

RELATED APPLICATION(S)

The present application claims the benefit of U.S. provisional application Ser. No. 61/186,193, entitled: "Improved Rate Control for Visual Quality Enhancement in a Video CODEC", filed on Jun. 11, 2009, naming Mathew et al as inventors, and is incorporated in its entirety herewith.

BACKGROUND

1. Technical Field

Embodiments of the present disclosure relate generally to image processing, and more specifically to reducing flicker in the display of video streams.

2. Related Art

A video stream refers to a sequence of image frames representing a scene of interest. The image frames may be generated and displayed at rates (e.g., thirty frames per second) suitable to create the impression of continuity between the image frames to a viewer. Image frames constituting a video stream are typically encoded prior to transmission and/or storage. The encoding may include operations such as compression, encryption, quantization, etc. At a receiving or display end, the image frames are decoded to reconstruct the original frames prior to display.

Flicker generally refers to visual discontinuity that may be perceived in displayed video streams. Flicker may degrade visual quality of displayed video streams. It may, therefore, be desirable to encode image frames constituting the video stream in a manner so as to render display of the video stream flicker-free or at least to reduce the flicker.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

Image frames of a video stream are encoded with the aim of reducing flicker in the video stream when displayed. In one embodiment, the quantization parameter used to quantize an image frame is capped to be not greater than a quantization parameter used to quantize an immediately previous image frame in display order.

In another embodiment, the quantization step size used to quantize a macro-block of an image frame is computed based on the value of a quantization error of a co-located macro-block in an immediately previous image frame in display order.

In yet another embodiment, macro-block transform coefficients corresponding to high-frequency components are quantized using relatively higher quantization parameter values if the image frame is deemed to contain high activity.

In yet another embodiment, flicker-prone macro-blocks of a source frame are replaced by corresponding best-match macro-blocks of a previous reconstructed frame, prior to being encoded. The best-match macro-blocks are determined by motion estimation.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments will be described with reference to the accompanying drawings briefly described below.

FIG. 4A is a diagram illustrating an example macro-block having a high activity measure.

FIG. 4B is a diagram illustrating an example macro-block having a low activity measure.

FIG. 5 is a flow diagram illustrating the manner in which flicker is reduced in another embodiment.

The drawing in which an element first appears is indicated by the leftmost digit(s) in the corresponding reference number.

DETAILED DESCRIPTION

Various embodiments are described below with several examples for illustration.

1. Example Device

Figure 1:
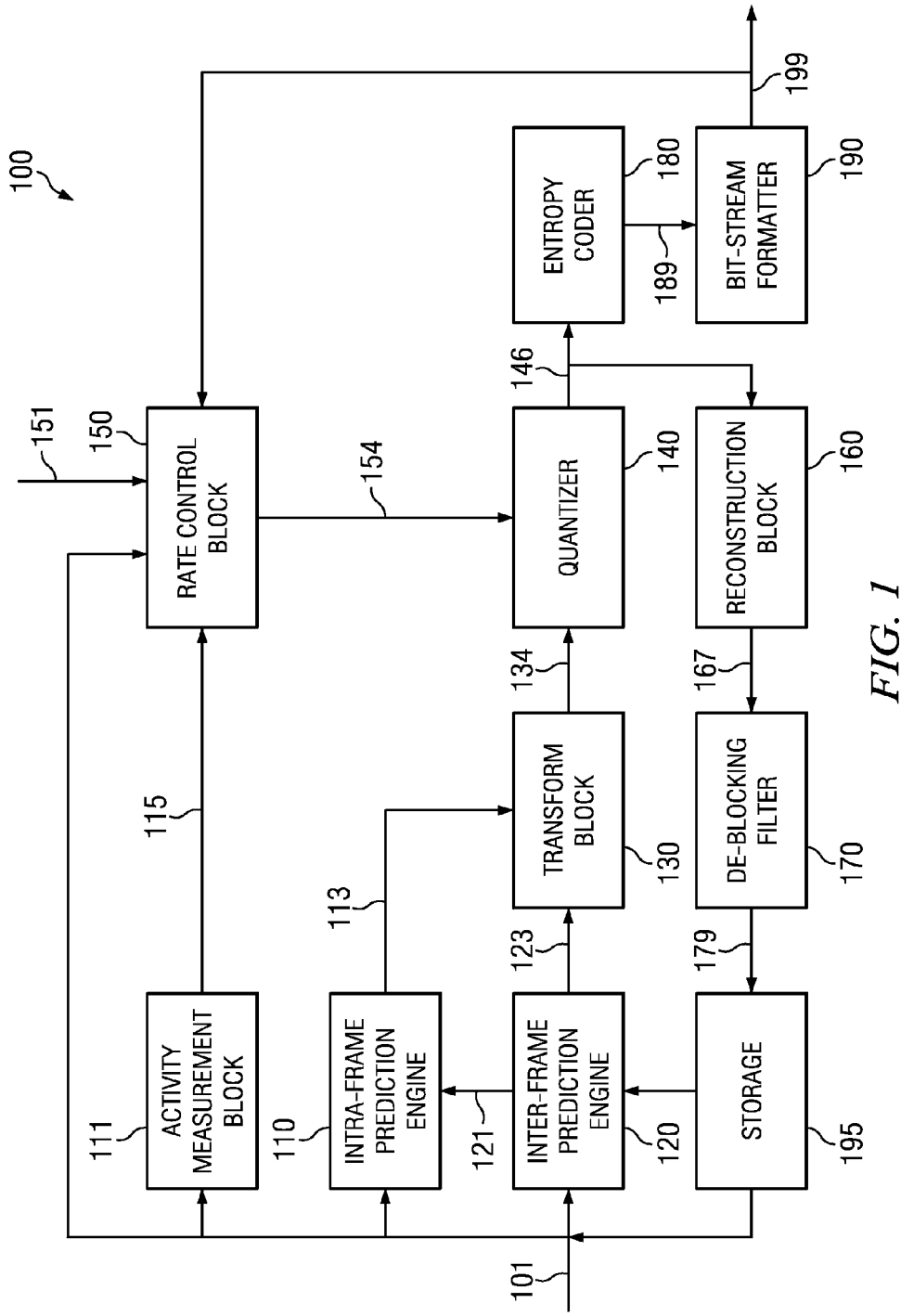
FIG. 1 is a block diagram illustrating the details of an example device in which several embodiments can be implemented.

FIG. 1 is a block diagram illustrating the details of an example device in which several embodiments can be implemented. Video encoder 100 is shown containing intra-frame prediction engine 110, inter-frame prediction engine 120, activity measurement block 111, transform block 130, quantizer 140, rate control block 150, reconstruction block 160, de-blocking filter 170, entropy coder 180, bit-stream formatter 190 and storage 195. The details of video encoder 100 of FIG. 1 are meant to be merely illustrative, and real-world implementation may contain more blocks/components and/or different arrangement of the blocks/components. Video encoder 100 receives source image frames to be encoded on path 101, and generates corresponding encoded frames (in the form of an encoded bit-stream) on path 199.

One or more of the blocks of video encoder 100 may be designed to perform video encoding consistent with one or more specifications/standards, such as H.261, H.263, H.264/AVC, in addition to being designed to address flicker reduction, as described in detail in sections below.

An image frame received on path 101 may be processed by either intra-frame prediction engine 110 or inter-frame prediction engine 120 or both, depending on whether an intra-coded frame (I-frame), inter-predicted frame (P-frame or B-frame) is to be provided to transform block 130. The specific technique (or combination of techniques) used to encode an image frame is referred to as an "encoding approach". The image frames received on path 101 may be retrieved from a storage device (for example, storage 195 or other storage device(s) connected to path 101, but not shown), and may be in (YCbCr) format. Alternatively, the image frames may be provided in (RGB) format, and converted (YCbCr) format internally in the corresponding blocks (blocks 110 and/or 120) prior to further processing.

For convenience of reference, a frame to be encoded as a P-frame/B-frame (i.e., using inter-frame encoding or using a combination of inter-frame and intra-frame encoding) is itself referred to herein as a P-frame/B-frame, whether prior to encoding or after encoding. Similarly, a frame to be encoded as an I-frame (i.e., using intra-frame encoding only) is referred to herein as I-frame, whether prior to or after encoding. The techniques used for encoding I, P and B frames are also referred to herein as corresponding encoding approaches. The term intra-frame encoding refers to an encoding approach in which macro-blocks of a frame are represented based only on macro-blocks of the same frame, and thus does not use other frames as reference frames. Inter-frame encoding refers to an encoding approach in which macro-blocks of a frame may be represented based on macro-blocks of the same frame and/or other frames termed reference frames.

Intra-frame prediction engine 110 receives image frames on path 101. Assuming a received image frame is to be encoded as an (I) frame, intra-frame prediction engine 110 operates to encode macro-blocks in the received image frame based on other macro-blocks in the same image frame. Intra-frame prediction engine 110 thus uses spatial compression techniques to encode an (I) frame. The specific techniques to encode an (I) frame may be performed consistent with the standard(s) noted above. Accordingly, intra-frame prediction engine 110 may operate to determine correlation between macro-blocks in the image frame. A macro-block determined to have high correlation (identical or near-identical content) with another (reference) macro-block may be represented by identifiers of the reference macro-block, the location of the macro-block in the image frame with respect to the reference macro-block, and the differences (termed residual) between pixel values of the two macro-blocks. Intra-frame prediction engine 110 forwards the compressed representation of a macro-block thus formed on path 113. For macro-blocks that are determined not to have high correlation with any other macro-block in the received image frame, intra-frame prediction engine 110 may forward the entire (uncompressed) macro-block contents (for example, original Y, Cb, Cr pixel values of pixels of the macro-block) on path 113.

Inter-frame prediction engine 120 receives image frames on path 101, and operates to encode the image frames as P-frames or B-frames. Inter-frame prediction engine 120 encodes macro-blocks of a frame to be encoded as a P-frame based on comparison with macro-blocks in a 'reference' frame that occurs earlier than the image frame in display order. Inter-frame prediction engine 120 encodes macro-blocks of a frame to be encoded as a B-frame based on comparison with macro-blocks in a 'reference' frame that occurs earlier, later or both, compared to the image frame in display order.

Inter-frame prediction engine 120 performs correlation between macro-blocks in a 'current' received image frame (on path 101) and macro-blocks in the reference frame received from storage 195, to determine macro-block pairs that are identical or near-identical in content. For matching macro-block pairs, inter-frame prediction engine 120 computes motion vectors representing the displacement between the macro-blocks. In addition, inter-frame prediction engine 120 computes corresponding residuals (differences between pixel values of the matching macro-blocks). Inter-frame prediction engine 120 forwards the motion vectors and the corresponding residuals on path 123. It is noted that a P-frame or a B-frame may also be encoded using a combination of intra-frame and inter-frame prediction, i.e., macro-blocks of P-frames and B-frames may be represented based on macro-blocks of the same frame and/or other frames termed reference frames. Thus, some macro-blocks of a P-frame or B-frame may be encoded by intra-frame prediction engine 110, while others may be encoded by inter-frame prediction engine 120.

Transform block 130 transforms the residuals received on paths 113 and 123 into a compressed representation, for example, by transforming the information content in the residuals to frequency domain. In an embodiment, the transformation corresponds to a discrete cosine transformation (DCT). Accordingly, transform block 130 generates coefficients representing the magnitudes of the frequency components of residuals received on paths 113 and 123. Transform block 130 also forwards motion vectors (received on paths 113 and 123) to quantizer 140 via path 134.

Activity measurement block 111 receives image frames on path 101, and determines the 'activity' represented in corresponding macro-blocks of the image frame. The term 'activity' herein refers to the extent of variation in the values of pixels contained in a macro-block. Thus, in general, a macro-block with higher 'activity' contains greater variation in its pixel values, and is termed as having more higher-frequency components (in terms of variation in the pixel values) than low-frequency components. On the other hand, a macro-block with lower 'activity' contains lesser variation in its pixel values, and is termed as having more of low-frequency components than high-frequency components. Activity measurement block 111 provides as an output, on path 115, an 'activity measure' representing the level of activity of the corresponding macro-block or the whole image frame.

Rate control block 150 receives image frames on path 101, activity measures of macro-blocks or entire image frames on path 115, and a 'current' transmission bit-rate from path 199, and operates to determine quantization parameter(s) to be used for quantizing macro-blocks of image frames. Rate-control block 150 may also receive data specifying a 'desired' bit-rate to be maintained (for bits transmitted on path 199) via path 151. Rate control block 150 provides the computed quantization parameter(s) on path 154.

In general, to maintain a desired transmission bit-rate and/or minimize storage requirements, macro-blocks with higher activity measures (as indicated by the output 115 of activity measurement block 111) may be quantized using fewer bits (coarse quantization). A desired transmission bit-rate and/or storage requirement may be viewed as representing a desired 'output limit' of the bit-stream on path 199. Text portions frequently correspond to high-activity portions of an image frame. Consequently, coarse quantization of text portions may degrade perceptual quality of the text (i.e., when decoded or reconstructed). Hence it may be desirable to treat macro-blocks containing text differently from other macro-blocks, in terms of the number of bits used to represent the macro-blocks.

Quantizer 140 divides the values of coefficients corresponding to a macro-block (residual) by a corresponding quantization parameter (Qp) received on path 154. Alternatively, quantizer 140 may divide each coefficient in a set of coefficients representing a macro-block (or a macro-block residual) by a corresponding one of a set of quantization parameters in a scaling matrix received on path 154. In general, the operation of quantizer 140 is designed to represent the coefficients by a using a desired number of quantization steps, the number of steps used (or correspondingly the value of Qp or the values in the scaling matrix) determining the number of bits used to represent the residuals. Quantizer 140 forwards the quantized coefficient values and motion vectors on path 146.

Entropy coder 180 receives the quantized coefficients, as well as motion vectors, on path 146, and allocates codewords to the quantized transform coefficients. Entropy coder 180 may allocate codewords based on the frequencies of occurrence of the quantized coefficients. Frequently occurring values of the coefficients are allocated codewords that require fewer bits for their representation, and vice versa. Entropy coder 180 forwards the entropy-coded coefficients on path 189.

Bit-stream formatter 190 receives the compressed, quantized and entropy coded output (referred to as a bit-stream, for convenience) of entropy coder 180, and may include additional information such as headers, information that may be required to enable a decoder to decode the encoded frame, etc., to the bit-stream. Bit-stream formatter 190 may transmit or store locally the formatted bit-stream representing encoded images.

Reconstruction block 160 receives compressed and quantized (in general, encoded) image frames on path 146, and operates to reconstruct the encoded image frames to generate the corresponding source frames. The operations performed by reconstruction block 160 may be the reverse of the operations performed by the combination of blocks 110, 120, 130 and 140, and may be designed to be identical to those performed in a video decoder that operates to decode the encoded frames transmitted on path 199. Reconstruction block 160 forwards frames on path 167 to de-blocking filter 170. The reconstructed frames generated by reconstruction block 160 may be used as reference frames in inter-frame prediction engine 120 for encoding macro-blocks.

De-blocking filter 170 operates to remove visual artifacts that may be present in the reconstructed macro-blocks (of image frames) received on path 167. The artifacts may be introduced in the encoding process due, for example, to the use of different modes of encoding (e.g., I-frame and P-frame). Artifacts may be present, for example, at the boundaries/edges of the received macro-blocks, and de-blocking filter 170 operates to smoothen the edges of the macro-blocks to improve visual quality. De-blocking filter 170 may be implemented consistent with corresponding video coding standards noted above. De-blocking filter 170 forwards the filtered frames on path 179 for storage in storage 195. Storage 195 represents a memory component, and is used to store reconstructed frames.

Flicker may result due to the specific technique(s) used to encode frames constituting the video stream. For example, flicker may be perceived at boundaries between frames encoded according to different encoding modes. Thus, for example, flicker may be perceived at a boundary between an inter-coded frame and an intra-coded frame. Other causes of flicker may include greater difference between (i.e., more lossy encoding) encoded image frames and the corresponding original image frames, presence of high frequency content in the original image frame which are not represented correctly at low bit rates due to use of higher quantization parameters, etc.

Figure 2:
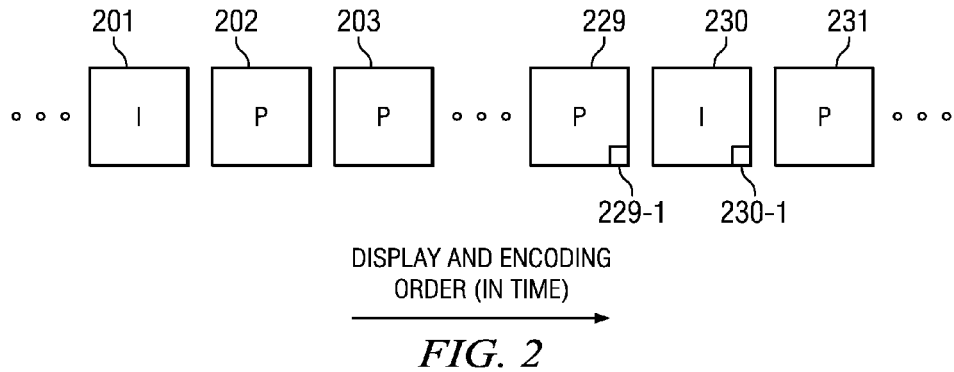
FIG. 2 is a diagram showing a sequence of source image frames in display order.

An example occurrence of flicker is at a transition between a P-frame and an I-frame. FIG. 2 shows a sequence of source image frames in display/generation order sequence, source frame 201 being generated earliest, and source frame 231 being generated last among the frames shown. Only P-frames and I-frames are shown in the video stream shown in FIG. 2. However, other types of frames (encoded using other encoding techniques, for example bi-directionally coded B-frames) can also be present in the video stream. Frame 201 is assumed to be encoded as an I-frame. Frames 202 through 229 are encoded as P-frames. Frame 230 is encoded as an I-frame (typically to allow a level of random access at a decoder, I-frames not requiring other frames to decode). Frame 231 is encoded as a P-frame. In a video stream, an I-frame may occur once for every thirty or sixty frames. However, other frequencies of occurrence are also possible.

Since the encoding techniques used for forming I-frames is different from the encoding techniques used to obtain P-frames, the transition from frame 229 to 230 (and also from 230 to 231) may be associated with flicker. P-frames generally have higher compression ratios compared to I-frames. To maintain a desired transmission bit-rate (or to achieve target storage requirements), the quantization parameter provided by rate control block 150 for quantizing frame 230 may be larger than the quantization parameter for quantizing frame 229 (or 231). Thus, frame 230 may be encoded using fewer bits than required for good visual quality and low flicker.

Flicker may be represented quantitatively using a 'flicker measure'. Some example techniques for computing flicker measures are noted below:

$$D1 = SAD[(frec\text{-}n - frec\text{-}n-1)] - SAD[(forg\text{-}n - forg\text{-}n-1)] \quad \text{Equation 1a}$$

wherein,
D1 is the flicker measure,
forg-n represents the $n^{th}$ original (source) frame,
frec-n represents the $n^{th}$ reconstructed frame,
forg-n−1 represents the $(n-1)^{th}$ original (source) frame,
frec-n−1 represents the $(n-1)^{th}$ reconstructed frame, and
SAD [ ] represents a sum of absolute differences of corresponding co-located pixel values in the frames within parentheses [ ].

Another flicker measure is specified in Equation 1b:

$$D2 = \max\{0, [SAD(frec\text{-}n - frec\text{-}n-1) - SAD(forg\text{-}n - forg\text{-}n-1)]\} \quad \text{Equation 1b}$$

wherein,
D2 is the flicker measure,
forg-n, frec-n, forg-n−1, frec-n−1 and SAD [ ] are as noted in Equation 1a, and
max { } is a maximum value operation.

An alternative flicker measure is specified by Equation 1c:

$$D3 = \max\{0, [SSD(frec\text{-}n - frec\text{-}n-1) - SAD(forg\text{-}n - forg\text{-}n-1)]\} \quad \text{Equation 1c}$$

wherein,
D3 is the flicker measure,
forg-n, frec-n, forg-n−1, frec-n−1 are as noted in Equation 1a,
max { } is a maximum value operation, and
SSD ( ) represents a sum of squared differences of corresponding co-located pixel values in the frames within parentheses ( ).

Several techniques described below enable reduction of flicker in video streams.

2. Quantization Parameter Capping for I-Frames

Figure 3:
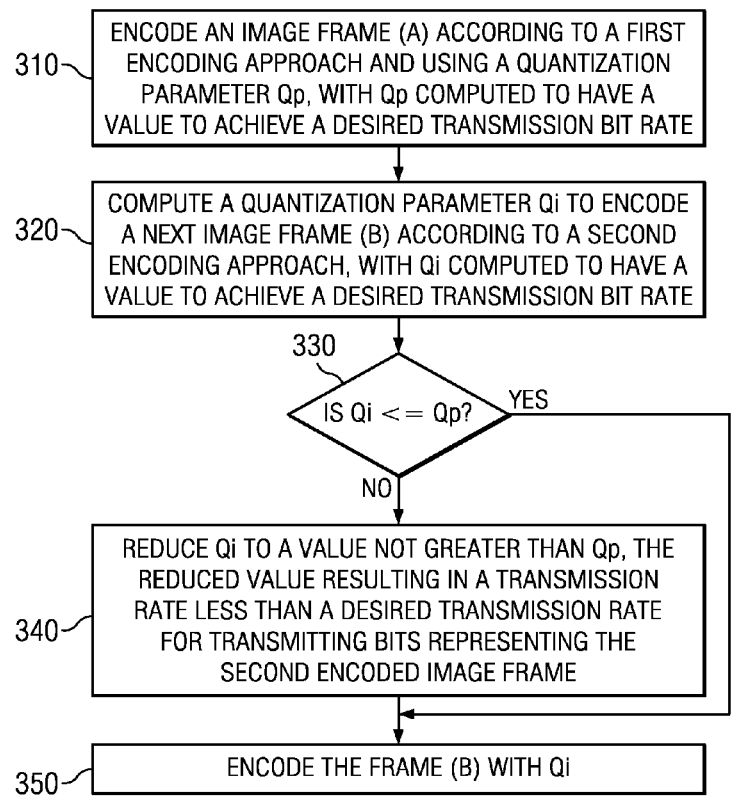
FIG. 3 is a flow diagram illustrating the manner in which flicker is reduced in video streams, in an embodiment.

FIG. 3 is a flow diagram illustrating the manner in which flicker is reduced in video streams, in an embodiment. The flow diagram is described with respect to video encoder 100 of FIG. 1, merely for illustration. However, various features described herein can be implemented in other devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 310 according to the flow diagram, video encoder 100 encodes an image frame (A) according to a first encoding approach and using a quantization parameter Qp. Qp represents the average value of the quantization parameters used for quantizing the macro-blocks of frame (A). Qp may be computed by rate control block 150 to have a value designed to satisfy a desired transmission rate for transmitting bits of the encoded frame obtained by encoding frame (A). The transmission rate, in turn, may be computed based on the number of frames to be transmitted in unit time. Control then passes to step 320.

In step 320, rate control block 150 computes a quantization parameter Qi to encode a next (immediately following image frame (A) in generation/display order) image frame (B) according to a second encoding approach, with Qi being computed to have a value to achieve a desired transmission rate for transmitting bits of the encoded frame obtained by encoding frame (B). Again, the transmission rate may be computed based on the number of frames to be transmitted in unit time. Control then passes to 330.

In step 330, rate control block 150 checks if Qi is less than or equal to Qp. If Qi is less than or equal to Qp, control passes to step 350. However, if Qi is greater than Qp, control passes to step 340.

In step 340, rate control block 150 reduces Qi to a value not greater than Qp. Reduction in Qi results in higher number of bits being used to quantize (macro-blocks of) frame (B). Rate control block 150 performs such reduction even if the transmission of the higher number of bits would result in a transmission rate for the encoded frame obtained by encoding frame (B) less than the desired value. Control then passes to 350.

In step 350, video encoder 100 encodes frame (B) with Qi. Thus, rate control block 150 quantizes macro-blocks in frame (B) with quantization parameter Qi.

The operations of the steps above are illustrated with an example, and with reference to FIG. 2. Assume that to achieve the desired transmission rate (number of frames per second), the average value of Qp for P-frame 229 is 32 and Qi for I-frame 230 is 40. P-frame 229 and I-frame 230 correspond respectively to frame (A) and frame (B) of the flow diagram of FIG. 3. Since Qi is not less than or equal to Qp, rate control block 150 reduces Qi to 32. Macro-blocks of I-frame 230 are then each quantized using a quantization parameter value of 32. However, if the computed value of Qp is 32 and that of Qi is 24, then Qi is not reduced, and macro-blocks of frame (B) are each quantized with a quantization parameter value of 24.

The use of quantization parameter for I-frames, modified if necessary to be not greater than the quantization parameter used for a previous P-frame, reduces flicker by maintaining the quality of the frames consistent by not allowing wide variations in the quality of the encoded I and P frames. The use of a reduced value of quantization parameter for the I-frame may result in the desired transmission rate not being maintained for the interval in which the encoded I-frame is transmitted. In an embodiment, the reduction in transmission rate is compensated for by using fewer bits for encoding the following P-frames. Thus, P-frame 231, as well as other following P-frames (not shown in FIG. 2), are quantized with fewer bits to compensate for the transmission rate reduction.

In another embodiment, video encoder 100 attempts to reduce possible flicker caused by an I-frame, by computing step sizes for quantizing the residual obtained for macro-block in the I-frame based on the quantization error associated with a co-located macro-block in a previous reconstructed non-I frame, as described next.

3. Computation of Step Size Based on Quantization Error

The quantization error of a macro-block may be expressed by the equation below:

$$Dsse = \Sigma_i \Sigma_j (O_{i,j} - R_{i,j})^2 \qquad \text{Equation 2A}$$

wherein,

Dsse represents the quantization error as a sum-of-squared errors, $\Sigma$ represents a summation operator, $O_{i,j}$ represents the value of a pixel at co-ordinates (i,j) in a macro-block 'O' in the original input image frame, $R_{i,j}$ represents the value of a pixel at co-ordinates (i,j) in a macro-block 'R' in the reconstructed reference frame (reconstructed from the original input image frame after encoding), 'i' is an index that has a range of values equal to the number of pixels along the width direction of a macro-block in the skip-coded image frame, and 'j' is an index that has a range of values equal to the number of pixels along the height direction of a macro-block in the skip-coded image frame.

Dsse of Equation 2 may also be expressed by the following equation:

$$Dsse = S_p^2 / K \qquad \text{Equation 2B}$$

wherein $S_p$ represents the step size used for quantizing the residual of macro-block 'O', and K is a constant.

The value of K is typically 12, but may be different from 12 depending on the content of macro-block 'O' and the bit rate used to transmit the representation of macro-block 'O'. In particular, a value of 12 for K may not be valid at low bit-rates and when image frame 'O' has a skip-coded macro-blocks. It is noted here that a macro-block is termed as being skip-coded (or skip macro-block) when the residual obtained for the macro-block has a maximum value less than the step size used for quantizing the residual. Thus, for a skip-coded (or skip) macro-block no residual or motion vectors are transmitted. Video encoder 100 may only specify that the macro-block is skip-coded. Since the residual cannot be represented due to being smaller than the step size, the residual itself represents the quantization error for the skip-coded macro-block.

The use of a same value of quantization parameter (and therefore a same quantization step size) for each of corresponding colocated macro-blocks in a pair of frames may not produce the same quantization error for each of the encoded macro-block. It is noted that the quantization parameter and the quantization step size have a one-to-one correspondence.

Referring to FIG. 2, for example, assume that a quantization step size 51 is used to quantize each of macro-blocks 229-1 (in P-frame 229) and 230-1 (in I-frame 230). Macro-blocks 229-1 and 230-1 are termed co-located macro-blocks, as they are located in the same position within the corresponding image frames 229 and 230. However, as noted above, the use of a same value S1 for quantizing each of macro-blocks 229-1 and 230-1 may result in different quantization errors for each of the macro-blocks 229-1 and 230-1. Such difference may lead to perception of flicker at the boundary of frames 229 and 230. Hence, in the embodiment, the quantization step size for quantizing a macro-block (e.g., 230-1) is computed on the basis of the quantization error associated with a co-located macro-block (e.g., 229-1) in an immediately previous frame.

Thus, for example, video encoder 100 computes quantization error Dsse (as specified in Equation 2) for a macro-block (e.g., 229-1) in a 'previous' frame (e.g., P-frame 229). Then, for the co-located macro-block (e.g., 230-1) in the 'current frame (e.g., I-frame 230) video encoder computes the quantization step size $S_i$ as specified in Equation 3 below:

$$S_i = \text{sqrt}(K^* Dsse) \qquad \text{Equation 3}$$

wherein,

'sqrt' represents a 'square root of' operation, and

K and Dsse are as specified in equations 2A and 2B above. Equation 3 is merely illustrative. Other techniques can also be be used to derive the quantization step size. In general, the quantization step size for a macro-block in a macro-block of a 'current' frame is computed as a function of the quantization error associated with a co-located macro-block in an immediately previous frame. The specific value of K may be determined empirically.

In another embodiment, the quantization error of a macro-block in a frame F1 is computed using sum-of-absolute-differences (SAD), as specified by Equation 4:

$$Dsad = \Sigma_i \Sigma_j \text{abs}((O_{i,j} - R_{i,j})) \qquad \text{Equation 4}$$

wherein $\Sigma$, $O_{i,j}$, $R_{i,j}$ 'i' and 'j' are as specified with respect to Equation 2A, 'abs' is an absolute value operator, and Dsad is the SAD of the macro-block.

Dsad of Equation 4 can be approximated to equal $S_p/K1$, wherein $S_p$ represents the step size used for quantizing the macro-block, and K1 is a constant with a value typically in the range 2 to 4.

For a co-located macro-block in an immediately next frame F2, the quantization step size $S_i$ is computed as specified in equation 5 below:

$$S_i = Dsad * K1 \qquad \text{Equation 5}$$

Again, Equation 5 is provided merely by way of illustration. Other similar expression for Dsad can instead be used as well to express the quantization step size as well. In general, Si may be specified as below:

$$Si = f(Dsad),$$

wherein f( ) represents a 'function of' operation.

In general, computation of the step size as described above is designed to generate a quantization parameter for a current frame (e.g., I-frame 230 of FIG. 2) that provides a same 'level of video quality' as the previous frame (e.g., P-frame 229). The above technique is based on the observation that human eyes tend to perceive flicker whenever there is a change in video quality between frames.

4. Scaling Matrices

In yet another embodiment, video encoder 100 bases a decision of whether a single quantization parameter or different quantization parameters are to be used for quantizing macro-blocks of each image frame forming a video stream on the activity measure computed by activity measurement block 111 for the corresponding image frame. FIGS. 4A and 4B are used to illustrate the term 'activity measure', and show macro-blocks 400 and 450, square blocks in each of which are assumed to represent pixels. Macro-block 400 (assumed to be a 4×4 pixel macro-block) is shown as having large variations in the pixel values (neighboring pixels shown as alternately 'black' and 'white'). Macro-block 450 (also assumed to be a 4×4 pixel block) is shown as having no variations in its pixel values. Hence, the activity measure of macro-block 400 is higher than that of macro-block 450.

The manner in which flicker is reduced in the embodiment is illustrated with respect to the flow diagram of FIG. 5. Again, the flow diagram is described with respect to the blocks of video encoder 100 of FIG. 1, merely for illustration. However, various features described herein can be implemented in other devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 510, video encoder 100 computes an activity measure for an image frame. A higher activity measure indicates that high frequency components (indicating the presence of higher variations in the values of pixels in the image frame) are present, while a relatively lower activity measure indicates lesser variation in the values of pixels in the image frame. Control then passes to step 520.

In step 520, video encoder 100 checks if the activity measure is less than a threshold. The threshold may be determined empirically. If the activity measure is less than the threshold, control passes to step 530 and to step 540 otherwise.

In step 530, video encoder 100 quantizes all transform coefficients of a macro-block of the image frame using a same quantization parameter.

In step 540, video encoder 100 quantizes transform coefficients which represent higher frequency components with a quantization parameter value which is greater than a quantization parameter value used to encode transform coefficients of the macro-block which represent lower frequency components.

The technique of flicker reduction described with respect to FIG. 5 is based on the recognition that, in general, frames containing higher frequency components (greater pixel value variations) contribute more to the perception of flicker. Hence, by forcing the use of fewer bits to represent higher frequency components, the magnitude of the higher frequency components is reduced, thereby reducing flicker. Video encoder 100 may apply the technique of FIG. 5 on all frames (i.e., irrespective of whether a frame is to be encoded as a P-frame, I-frame, etc.).

In an embodiment, activity measurement block 111 contained in video encoder 100 computes the 'activity measure' of a macro-block according to equations 6 and 7.

$$dij = |Oij - Oi(j-1)| + |Oij - O(i-1)j| \qquad \text{Equation 6}$$

wherein, $Oij - Oi(j-1)$ is the difference between the pixel values at locations (i,j) and (i,j-1), and is a measure of 'horizontal activity', $Oij - O(i-1)j$ is the difference between the pixel values at locations (i,j) and (i-1,j), and is a measure of 'vertical activity', dij is the sum of absolute values of horizontal and vertical activity corresponding to a pixel.

Activity measure for a macro-block 'mbAct' is then obtained as the sum of dij values obtained for all pixels in the macro-block, as described by equation 7:

$$mbAct = \Sigma_w \Sigma_h (dij) \qquad \text{Equation 7}$$

wherein, $\Sigma_w$ represents a summation operation of dij values along the width direction of the macro-block, $\Sigma_h$ represents a summation operation of dij values along the height direction of the macro-block, and the limits of summation range from 0 to N, width wise and height-wise, with N representing the size (in terms of the number of pixels) in a square macro-block.

Finally, activity measure for the whole frame is obtained by adding the activity measures (mbAct) obtained for each of the macro-blocks in the frame.

Assuming for example that the activity measure for a frame 'A' is determined to be less than the threshold of step 520 of FIG. 5, and that frame 'A' is divided into blocks, video encoder 100 may use 20 as the quantization parameter for encoding transform coefficients of each of the blocks in frame 'A'. On the other hand, if the activity measure of frame 'A' is higher than the threshold, video encoder 100 may use a scaling matrix (such as example scaling matrix B, shown below) to quantize transform coefficients of each of the blocks. For example, for a 4×4 pixel block, the corresponding scaling matrix (scaling matrix B below) may have values as shown below:

$$B=\{12,26,26,40,40,40,56,56,56,56,64,64,74,74,84\}$$

The sixteen entries of example scaling matrix B correspond, from left to right respectively, to frequency components (transform coefficients) from lower to higher frequencies in zig-zag order. It may be observed that the quantization parameters corresponding to higher frequency components (e.g., last entry 84 is the quantization parameter for the highest frequency component) are higher, thereby reducing their magnitudes.

5. Use of a Modified Source Frame for Intra-Frame Encoding

Figure 6:
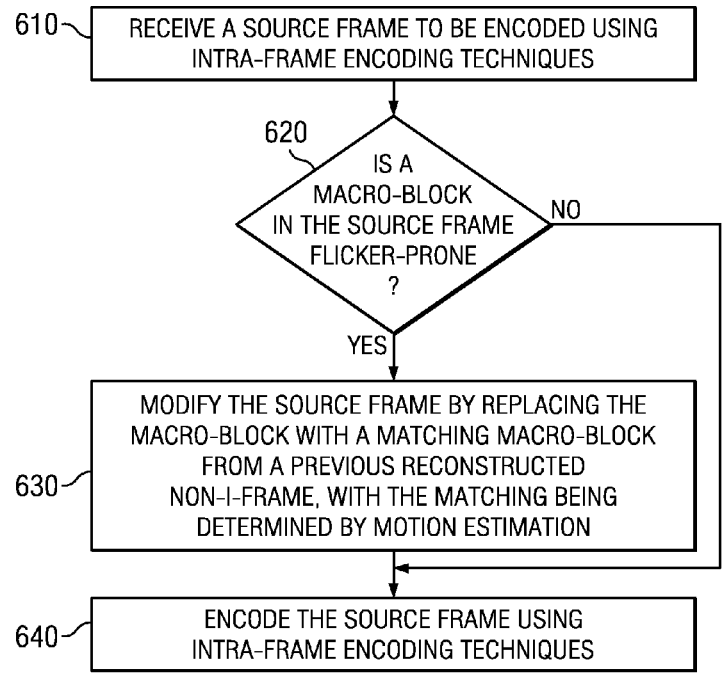
FIG. 6 is a flow diagram illustrating the manner in which flicker is reduced in yet another embodiment.

FIG. 6 is a flow diagram illustrating the manner in which flicker is reduced in another embodiment. Again, the flow diagram is described with respect to the blocks of video encoder 100 of FIG. 1, merely for illustration. However, various features described herein can be implemented in other devices and/or environments and using other components, as will be apparent to one skilled in the relevant arts by reading the disclosure provided herein. Further, the steps in the flow diagram are described in a specific sequence merely for illustration. Alternative embodiments using a different sequence of steps can also be implemented without departing from the scope and spirit of several aspects of the present invention, as will be apparent to one skilled in the relevant arts by reading the disclosure provided herein.

In step 610, video encoder 100 receives a source frame to be encoded using intra-frame encoding techniques. The term source frame refers to an image frame that has not been processed for encoding. The source frame may be contained in a video stream containing multiple image frames, some of which are to be encoded as I-frames, and others as non-I-frames. Control then passes to step 620.

In step 620, video encoder 100 determines whether a quantitative parameter ('flicker measure') indicative of flicker when a macro-block in the source frame is displayed is higher than a threshold, i.e., video encoder 100 determines whether the macro-block is 'flicker-prone'. The term 'flicker-prone' is used to mean that the image represented by the macro-block would cause a perception of flicker when displayed, and may be quantitatively represented by corresponding measures. If the macro-block is determined to be flicker-prone (the flicker measure is greater than threshold), control passes to step 630, and to step 640 otherwise.

In step 630, video encoder 100 modifies the source frame by replacing the macro-block with a matching macro-block from a previous reconstructed non-I-frame. The matching macro-block may be determined by motion estimation techniques. In an embodiment, the previous reconstructed non-I-frame corresponds to the reconstruction of an immediately previous P-frame. Control then passes to step 640.

In step 640, video encoder 100 encodes the source frame using intra-frame encoding techniques.

Figure 7:
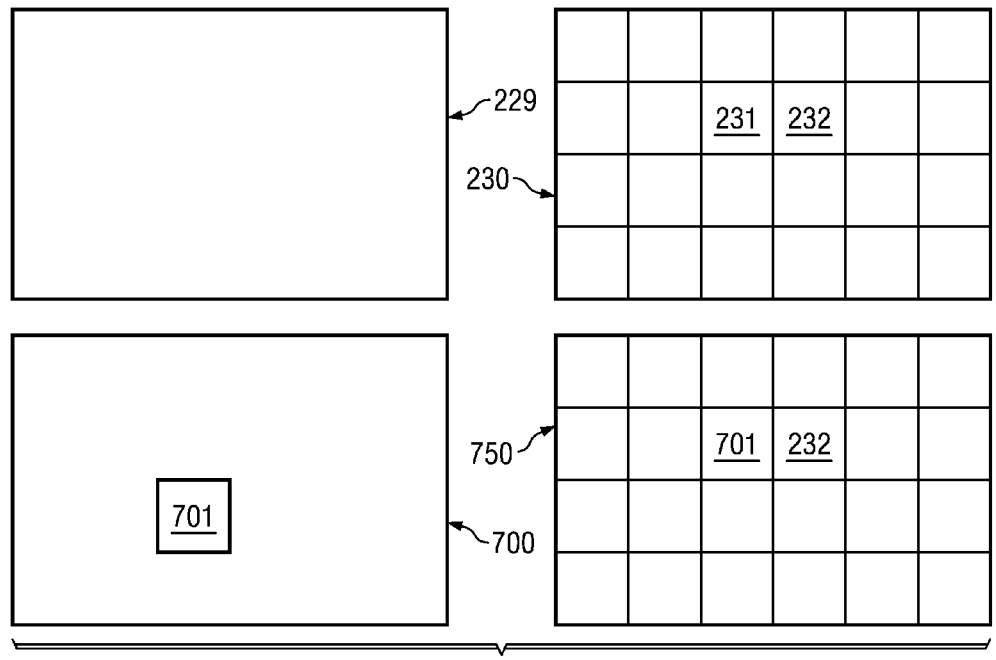
FIG. 7 is a diagram used to illustrate the manner in which a source frame is modified prior to intra-frame encoding, in an embodiment.

The operations of the steps noted above are illustrated with an example with reference to FIG. 7. Image frames 229 and 230 (of FIG. 1) are again shown in FIG. 7, with image frame (source frame) 229 to be encoded as a P-frame and image frame (source frame) 230 to be encoded as an I-frame. Frame 700 represents a frame obtained by reconstructing the encoded P-frame obtained by encoding source frame 229. Frame 750 shows source frame 230 after processing.

Source frame 230 is shown divided into twenty four macro-blocks. As an example, assume that macro-block numbered as 231 in source frame 230 is determined to be flicker-prone, and macro-block numbered 232 is determined not be flicker-prone. Inter-frame prediction engine 120 performs a motion estimation to determine the displacement of macro-block 231 with respect to reconstructed P-frame 700. Thus, inter-frame prediction engine 120 determines a best-matching (in terms of pixel values) macro-block in reconstructed frame 700 corresponding to macro-block 231. The best-matching macro-block is shown labeled as macro-block 701 in frame 700.

Inter-frame prediction engine 120 then replaces macro-block 231 with macro-block 701. 'Intermediate' frame 750 represents source frame 230 after the replacement noted above. Assuming that macro-block 232 is determined not to be flicker-prone, macro-block 232 is retained as also depicted in 'intermediate' frame 750. Inter-frame prediction engine 120, similarly, either replaces (with best-match macro-blocks from frame 700) or retains other macro-blocks of source frame 230 in generating intermediate frame 750. Inter-frame prediction engine 120 then forwards intermediate frame 750 to intra-frame prediction engine 110 via path 121. Intra-frame prediction engine 110 then encodes intermediate frame 750 as an I-frame.

Thus, in the embodiment, a source frame to be encoded as an I-frame may be processed to generate an 'intermediate' frame by selectively replacing macro-blocks in the source frame by corresponding matching macro-blocks from an immediately previous reconstructed P-frame. The 'intermediate' frame is then encoded (rather than the source frame itself) using intra-frame encoding to obtain an I-frame. In an embodiment, the modification of step 630 is done only for luma component of the macro-block, i.e., only the luma components of the macro-block are replaced by luma components of the matching macro-block in the reconstructed frame. Chroma components of the macro-block in the source frame are retained. However, in other embodiments, both luma and chroma components may be replaced.

Since flicker-prone macro-blocks in the source frame are replaced by a matching macro-block from an immediately previous P-frame, the modified source frame (intermediate frame), is very similar in terms of content to the previous P-frame. Hence, the subsequently intra-frame encoded modified source frame contributes much reduced flicker (when decoded and displayed at a decoder end) than if the source frame had been directly (without modifications) intra-coded.

In an embodiment, video encoder 100 determines whether a macro-block in a source frame (macro-block 231 in frame 230 in the example above) is flicker-prone or not, based on a measure indicating the similarity between the macro-block in the source frame and a best-matching macro-block in the reconstructed P-frame (frame 700 in the example). In an embodiment, the measure is computed as a sum-of-absolute-differences (SAD) of the result of motion estimation; i.e. the best match pixel values in the macro-block in the source frame and the matching macro-block in the reconstructed P-frame. Hence, in the embodiment, motion estimation is performed for an I-frame to determine if a macro-block in the I-frame is flicker prone, as well as to obtain the best-matching block that is used to replace the original block in the current frame.

The SAD measure may be modified to generate a final 'flicker measure' as specified below in Equation 8 to account for the use of a previous reconstructed P-frame (rather than an original frame which would have given the best flicker measure). In one embodiment, the modified SAD measure (SAD-flicker) is generated as specified in equation 8 below:

$$SADFlicker=[SAD-(SAD*Qscale/64)-(mbAct/100)-100] \quad \text{Equation 8}$$

wherein,

SADFlicker is a flicker measure,

'*' is a multiplication operator,

Qscale is the quantization step-size applied for quantizing the co-located macro-block in the previous P-frame, mbAct is the activity measure of the macro-block to be encoded, and is computed as specified in Equation 7, and SAD is the sum-of-absolute-differences obtained during motion estimation.

The terms/constants that are subtracted from SAD in Equation 8, namely, (SAD*Qscale/64), (mbAct/100) and 100 are to account for the following:

a) A macro-block is more flicker-prone when the quantization step is higher.

b) A macro-block is more flicker-prone when its activity measure is higher.

c) The constants used in Equation 8 are empirically obtained. The computation of a flicker measure as shown in Equation 8 is provided merely by way of illustration. Other measures may also be used instead. In general, the flicker measure is computed as a function of the parameters SAD, Qscale and mbAct.

If the value of flicker measure SADFlicker as computed using Equation 8 is less than a threshold, then the macro-block is deemed as being flicker-prone. The threshold may be derived using empirical techniques based on the SAD values of the previous P frame (229 in FIG. 7).

The techniques for reducing flicker described above may be operative independently. Alternatively, a combination of one or more of the techniques may be implemented in video encoder 100 to improve on the benefits in flicker reduction provided by any one technique operating in isolation.

Video encoder 100 may be implemented using software, hardware, or a combination of hardware and software. In general, when throughput performance is of primary consideration, the implementation is done more in hardware (e.g., in the form of an application specific integrated circuit). When cost is of primary consideration, the implementation is performed more in software (e.g., using a processor executing instructions provided in software/firmware). Cost and performance can be balanced by employing a mix of hardware, software and/or firmware. Some of the implementation approaches noted above may be designed to incorporate at least some degree of parallelism or pipelining. For example, when the implementation is substantially in software, some of the time-critical and/or compute-intensive operations may be executed by dedicated hardware units, with the less time-critical and/or less compute-intensive operations being executed by software instructions. An example embodiment implemented substantially in software is described next.

6. Digital Processing System

Figure 8:
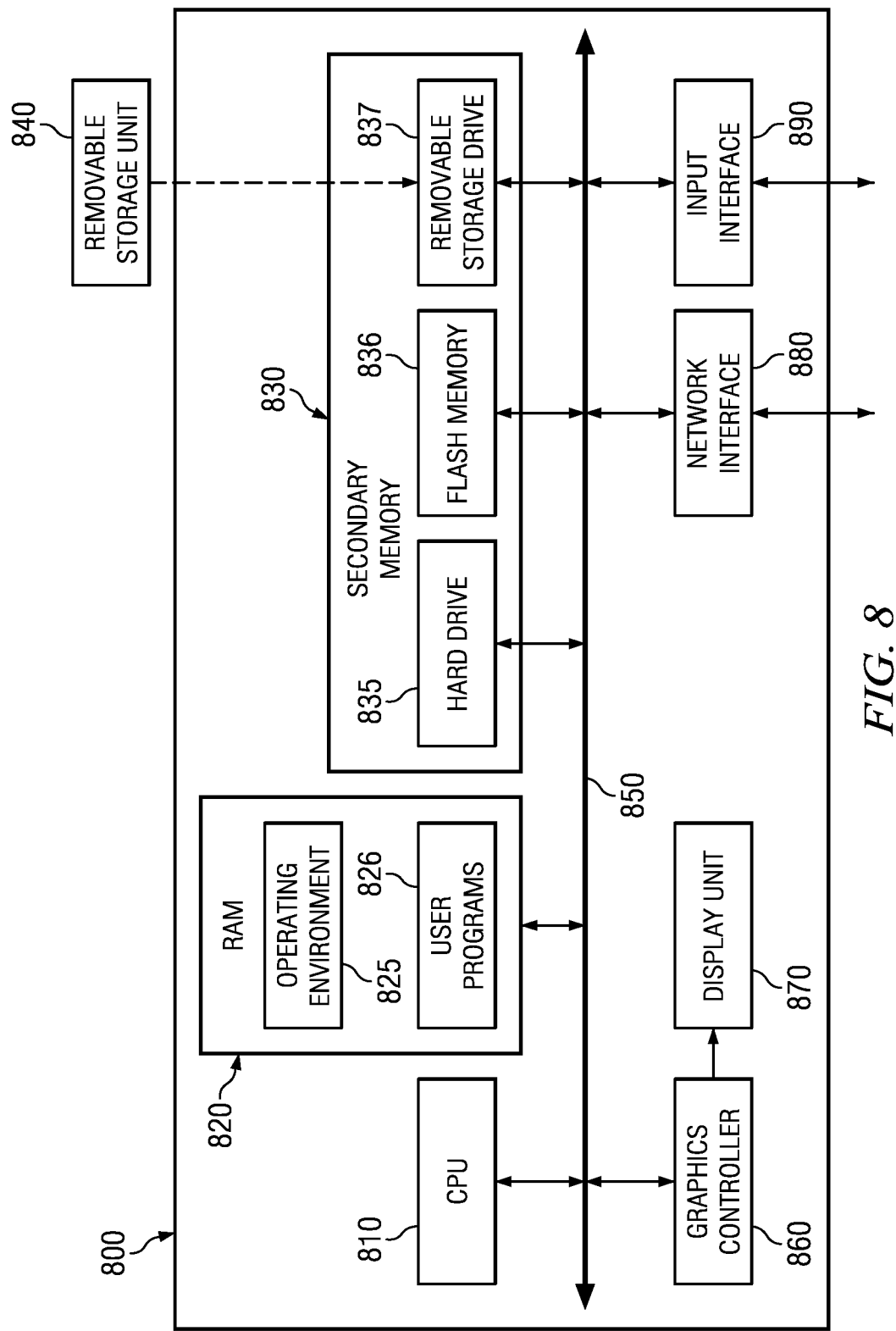
FIG. 8 is a block diagram illustrating the details of a digital processing system in which several embodiments can be implemented based on operation of software instructions.

FIG. 8 is a block diagram illustrating the details of a digital processing system (800) in which several embodiments of video encoder 100 of FIG. 1 are operative by execution of appropriate execution modules.

Digital processing system 800 may contain one or more processors such as a central processing unit (CPU) 810, random access memory (RAM) 820, secondary memory 830, graphics controller 860, display unit 870, network interface 880, and input interface 890. All the components except display unit 870 may communicate with each other over communication path 850, which may contain several buses as is well known in the relevant arts.

CPU 810 may execute instructions stored in RAM 820 to provide several features of the present invention. The instructions include those executed by the various blocks of FIG. 1. CPU 810 may contain multiple processing units, with each processing unit potentially being designed for a specific task. Alternatively, CPU 810 may contain only a single general-purpose processing unit.

RAM 820 may receive instructions from secondary memory 830 via communication path 850. RAM 820 is shown currently containing software instructions constituting operating environment 825 and/or user programs 826 (such as are executed by the blocks of FIG. 1). The operating environment contains utilities shared by user programs, and such shared utilities include operating system, device drivers, virtual machines, etc., which provide a (common) run time environment for execution of user programs/applications.

Graphics controller 860 generates display signals (e.g., in RGB format) to display unit 870 based on data/instructions received from CPU 810. Display unit 870 contains a display screen to display the images defined by the display signals. Input interface 890 may correspond to a keyboard and a pointing device (e.g., touch-pad, mouse), and may be used to provide inputs. Network interface 880 provides connectivity (by appropriate physical, electrical, and other protocol interfaces) to a network (not shown, but which may be electrically connected to path 199 of FIG. 1), and may be used to communicate with other systems connected to the network.

Secondary memory 830 may contain hard drive 835, flash memory 836, and removable storage drive 837. Secondary memory 830 may store data and software instructions, which enable digital processing system 800 to provide several features in accordance with the description provided above. The blocks/components of secondary memory 830 constitute computer (or machine) readable media, and are means for providing software to digital processing system 800. CPU 810 may retrieve the software instructions, and execute the instructions to provide various features of the embodiments described above Some or all of the data and instructions may be provided on removable storage unit 840, and the data and instructions may be read and provided by removable storage drive 837 to CPU 810. Floppy drive, magnetic tape drive, CD-ROM drive, DVD Drive, Flash memory, removable memory chip (PCMCIA Card, EPROM) are examples of such removable storage drive 837.

Removable storage unit 840 may be implemented using medium and storage format compatible with removable storage drive 837 such that removable storage drive 837 can read the data and instructions. Thus, removable storage unit 840 includes a computer readable (storage) medium having stored therein computer software and/or data. However, the computer (or machine, in general) readable medium can be in other forms (e.g., non-removable, random access, etc.).

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. A method of encoding a sequence of image frames, the method comprising:
    encoding a first image frame in the sequence according to a first encoding approach and using a first quantization parameter to form a first encoded image frame, wherein the first quantization parameter is computed to have a value designed to achieve a desired transmission rate for transmitting bits representing the first encoded image frame;
    computing a second quantization parameter for encoding a second image frame according to a second encoding approach, wherein the second encoding approach is not the same as the first encoding approach, wherein the second image frame immediately follows the first image frame in display order and wherein the second quantization step size derived from the quantization error associated with a co-located macro-block of a previous frame;
    determining if the value of the second quantization parameter is less than or equal to the value of the first quantization parameter;
    reducing the value of the second quantization parameter to a reduced value not greater than the value of the first quantization parameter if the second quantization parameter is greater than the value of the first quantization parameter, wherein the reduced value results in a transmission rate less than a desired transmission rate for transmitting bits representing the second encoded image frame; and
    encoding the second image frame according to the second encoding approach and using the second quantization parameter; wherein the first encoding approach comprises inter-frame encoding, the first encoded image frame being a P-frame, wherein the second encoding approach comprises only intra-frame encoding, the second encoded image frame being an I-frame,
    wherein the first quantization error of the first macro-block is specified by the equation:

$$Dsse = \Sigma_i \Sigma_j (O_{i,j} - R_{i,j})^2$$

wherein,
Dsse represents the first quantization error,
$\Sigma$ represents a summation operator,
$O_{i,j}$ represents the value of a pixel at co-ordinates (i,j) in a macro-block 'O' in the first image frame,
$R_{i,j}$ represents the value of a pixel at co-ordinates (i,j) in a macro-block 'R' in a reconstructed frame obtained by reconstructing the first encoded image frame,
'i' is an index that has a range of values equal to the number of pixels along the width direction of a macro-block, and
'j' is an index that has a range of values equal to the number of pixels along the height direction of a macro-block, wherein,
Dsse is also equal to $Qp^2/K$, wherein Qp represents the first quantization step size, and K is a constant,
wherein the second quantization step size is computed according to the equation:

$$Si = sqrt(K*Dsse),$$

wherein Si is the second quantization step size, and sqrt represents a 'square root of' operation.

2. The method of claim 1, wherein the first encoding approach comprises inter-frame encoding, the first encoded image frame being a P-frame, and wherein the second encoding approach comprises only intra-frame encoding, the second encoded image frame being an I-frame.

3. A method of encoding a sequence of image frames, the method comprising:
    encoding a first macro-block in a first image frame in the sequence according to a first encoding approach and using a first quantization step size to form a first encoded image frame; and
    encoding a second macro-block in a second image frame in the sequence according to a second encoding approach and using a second quantization step size to form a second encoded image frame, wherein the second encoding approach is not the same as the first encoding approach, wherein the second image frame immediately follows the first image frame in display order, wherein the first macro-block and second macro-block are co-located,
    wherein the first quantization step size results in a first quantization error for the first macro-block and wherein the first quantization error of the first macro-block is specified by the equation:

$$Dsad = \Sigma_i \Sigma_j abs((O_{i,j} - R_{i,j})), \text{ wherein}$$

Dsad represents the first quantization error,
$\Sigma$ represents a summation operator,
abs represents an absolute value operator,
$O_{i,j}$ represents the value of a pixel at co-ordinates (i,j) in a macro-block 'O' in the first image frame,
$R_{ij}$ represents the value of a pixel at co-ordinates (i,j) in a macro-block 'R' in a reconstructed frame obtained by reconstructing the first encoded image frame,
'i' is an index that has a range of values equal to the number of pixels along the width direction of a macro-block, and
'j' is an index that has a range of values equal to the number of pixels along the height direction of a macro-block,
wherein the second quantization step size is computed according to the equation:

$$Si = Dsad*K1,$$

wherein Si is the second quantization step size, '*' represents a multiply operation, and K1 is a constant; and
wherein the second quantization step size is derived from the value of the first quantization error.

4. The method of claim 3, wherein the value of constant K1 lies in the range 2 through 4.

5. A non-transitory readable medium storing one or more sequences of instructions for encoding a sequence of image frames in a video encoder, the sequence comprising a first plurality of source frames to be encoded using a first encoding approach and a second plurality of source frames to be encoded using a second encoding approach, wherein execution of the one or more sequences of instructions by one or more processors contained in the video encoder causes the video encoder to perform the actions of:
    receiving a source frame comprised in the first plurality of source frames;
    determining a measure indicating whether a first macro-block in the source frame will cause a perception of flicker when displayed;
    modifying the source frame by replacing the first macro-block with a best-matching macro-block from a second frame obtained by reconstructing a frame immediately previous in display order to the source frame encoded using the second encoding approach; and encoding the modified source frame using the first encoding approach comprising quantization step size derived from quantization error associated with a co-located macro-block of previous frame, wherein the replacing replaces the first macro-block only if the determining determines that the measure is less than a threshold, and wherein the best-matching macro-block is determined by motion estimation, and wherein computing the measure further comprises modifying the SAD value to obtain the measure according to the equation:

$$SADFlicker=[SAD-(SAD*Qscale/64)-(mbAct/100)-100],$$

wherein SADFlicker is the measure,

SAD is the sum-of-absolute-differences,

'*' is a multiplication operator,

Qscale is the quantization step-size applied for quantizing a co-located macro-block in the immediately previous frame in the same location as the first macro-block in the source frame, and mbAct is an activity measure indicating the extent of variation of pixel values of pixels in the co-located macro-block.

6. The non-transitory readable medium of claim 5, wherein the best-matching macro-block is obtained by performing motion estimation.

7. The non-transitory readable medium of claim 6, wherein the first encoding approach uses only intra-frame encoding, and the second encoding approach uses one or both of inter-frame encoding and intra-frame encoding.

8. The non-transitory readable medium of claim 6, wherein computing the measure comprises computing a sum-of-absolute-differences (SAD) value of corresponding pixel values in the first macro-block and the best-matching macro-block.

9. The non-transitory readable medium of claim 5, wherein the threshold is derived from the SAD values of macro-blocks of the immediately previous frame.

* * * * *